(12) United States Patent
Martino et al.

(10) Patent No.: US 10,084,900 B2
(45) Date of Patent: *Sep. 25, 2018

(54) PROVIDING AUDIO ANNOUNCEMENT TO CALLED PARTIES

(71) Applicant: I D YOU, LLC, Allen, TX (US)

(72) Inventors: Monica Rose Martino, Plano, TX (US); Kevin V. Nguyen, Allen, TX (US); M. Gregory Smith, Fairview, TX (US)

(73) Assignee: I D YOU, LLC, Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,724

(22) Filed: Feb. 22, 2017

(65) Prior Publication Data

US 2017/0163783 A1 Jun. 8, 2017

Related U.S. Application Data

(63) Continuation of application No. 15/345,840, filed on Nov. 8, 2016, which is a continuation of application No. 14/685,915, filed on Apr. 14, 2015, now Pat. No. 9,497,306, which is a continuation of application No. 14/315,618, filed on Jun. 26, 2014, now Pat. No. 9,008,292, which is a continuation of application No. 14/013,466, filed on Aug. 29, 2013, now Pat. No. 8,861,697, which is a continuation of application No. 12/890,829, filed on Sep. 27, 2010, now Pat. No. 8,548,140, which is a continuation-in-part of application No. 11/974,983, filed on Oct. 17, 2007, now Pat. No. 8,625,762.

(Continued)

(51) Int. Cl.
| | |
|---|---|
| H04M 1/56 | (2006.01) |
| H04M 15/06 | (2006.01) |
| H04M 1/57 | (2006.01) |
| H04M 3/42 | (2006.01) |
| H04M 1/2745 | (2006.01) |
| H04M 7/00 | (2006.01) |

(52) U.S. Cl.
CPC ..... *H04M 1/578* (2013.01); *H04M 1/274516* (2013.01); *H04M 3/42042* (2013.01); *H04M 3/42059* (2013.01); *H04M 7/0039* (2013.01)

(58) Field of Classification Search
CPC ......... H04M 3/42042; H04M 3/42059; H04M 3/436; H04M 15/06
USPC .......................... 379/142.01, 142.06, 373.04
See application file for complete search history.

(56) References Cited

U.S. PATENT DOCUMENTS

| | | | | |
|---|---|---|---|---|
| 6,721,406 B1 * | 4/2004 | Contractor | ............ | H04M 1/575 |
| | | | | 379/142.01 |
| 8,548,140 B2 * | 10/2013 | Martino | ................ | H04M 1/573 |
| | | | | 379/142.06 |

(Continued)

*Primary Examiner* — Quoc D Tran

(57) ABSTRACT

The present disclosure describes a system, method, and computer-readable medium for providing audio announcement of communications to a called party in a communication network. The method includes receiving communication from a calling party and performing a lookup of information relating to the calling party in a database via an Internet Protocol connection based on an identifier of at least one of the calling party and the called party. The information comprises one or more audio files. The method then provides the audio announcement to a called party based on the audio files.

20 Claims, 7 Drawing Sheets

Related U.S. Application Data

(60) Provisional application No. 60/934,407, filed on Jun. 13, 2007.

(56) References Cited

U.S. PATENT DOCUMENTS

| | | | | |
|---|---|---|---|---|
| 8,861,697 | B2* | 10/2014 | Martino | H04M 1/573 |
| | | | | 379/142.06 |
| 9,008,292 | B2* | 4/2015 | Martino | H04M 1/573 |
| | | | | 379/142.06 |
| 9,497,306 | B2* | 11/2016 | Martino | H04M 1/573 |
| 2004/0067751 | A1* | 4/2004 | Vandermeijden | H04M 1/57 |
| | | | | 455/414.1 |
| 2006/0085519 | A1* | 4/2006 | Goode | H04L 67/2852 |
| | | | | 709/218 |
| 2006/0184684 | A1* | 8/2006 | Weiss | G11B 27/105 |
| | | | | 709/231 |
| 2007/0127656 | A1* | 6/2007 | Citron | H04M 1/56 |
| | | | | 379/142.01 |

* cited by examiner

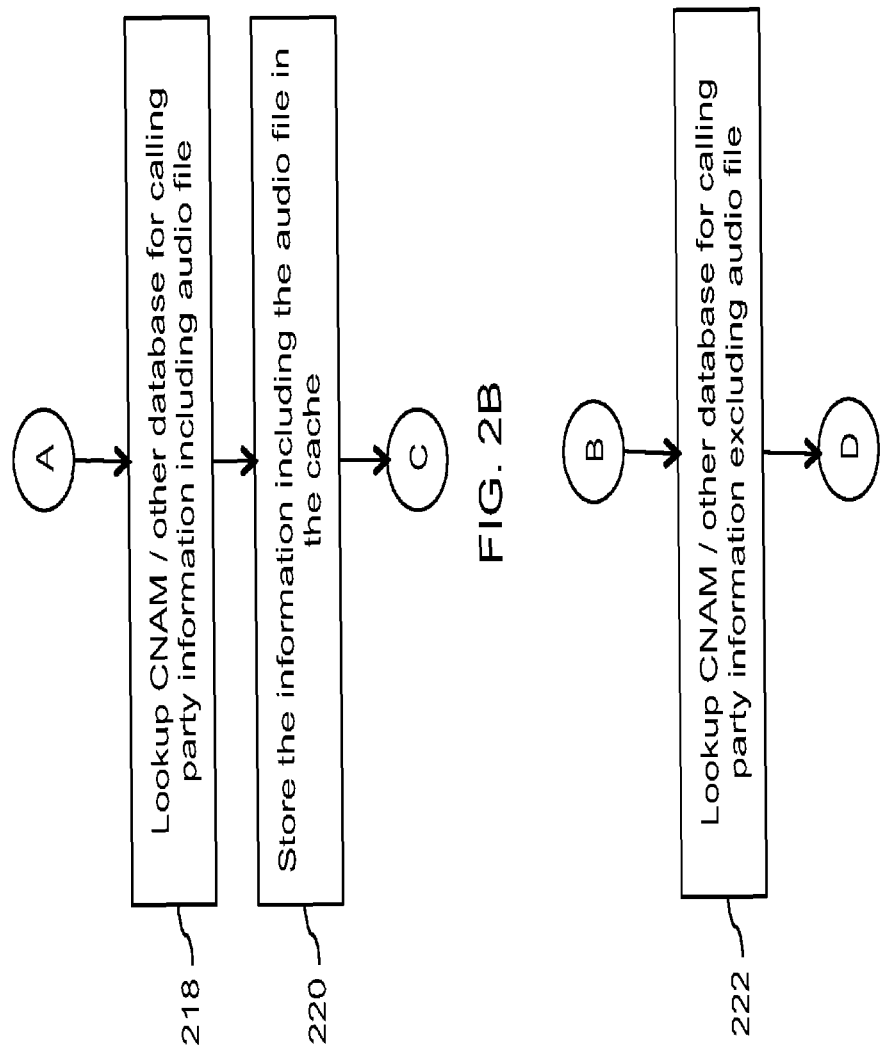

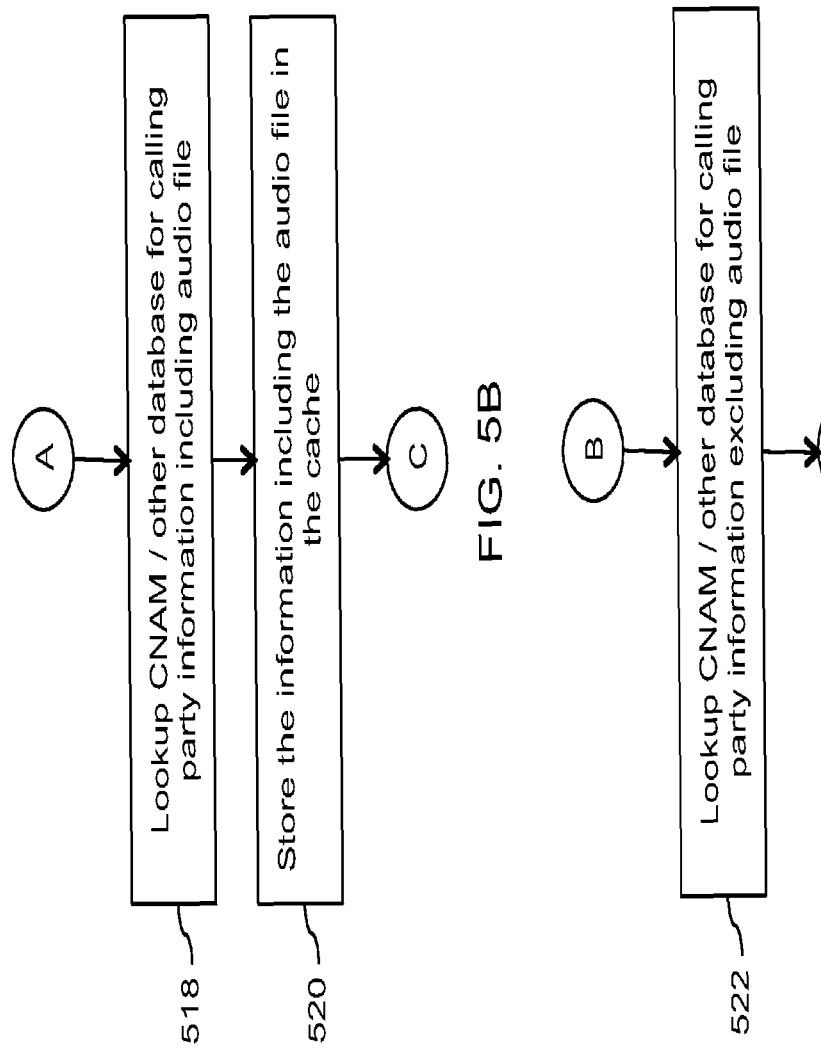

PROVIDING AUDIO ANNOUNCEMENT TO CALLED PARTIES

CROSS REFERENCE TO RELATED APPLICATIONS

This application is a Continuation of U.S. Non-Provisional application Ser. No. 15/345,840 entitled "PROVIDING AUDIO ANNOUNCEMENT TO CALLED PARTIES" and filed on Nov. 8, 2016, which is a Continuation of U.S. Non-Provisional application Ser. No. 14/685,915 entitled "PROVIDING AUDIO ANNOUNCEMENT TO CALLED PARTIES" and filed on Apr. 14, 2015, issued U.S. Pat. No. 9,497,306, issued on Nov. 15, 2016, which is a Continuation of U.S. Non-Provisional application Ser. No. 14/315,618 entitled "PROVIDING AUDIO ANNOUNCEMENT TO CALLED PARTIES" and filed on Jun. 26, 2014, issued U.S. Pat. No. 9,008,292, issued on Apr. 14, 2015, which is a Continuation of U.S. Non-Provisional application Ser. No. 14/013,466 entitled "PROVIDING AUDIO ANNOUNCEMENT TO CALLED PARTIES" and filed on Aug. 29, 2013, issued U.S. Pat. No. 8,861,697, issued on Oct. 14, 2014, which is a Continuation of U.S. Non-Provisional Ser. No. 12/890,829 entitled "PROVIDING AUDIO ANNOUNCEMENT TO CALLED PARTIES" and filed on Sep. 27, 2010, issued U.S. Pat. No. 8,548,140, issued on Oct. 1, 2013, which is a Continuation-In-Part (CIP) of U.S. Non-Provisional application Ser. No. 11/974,983 entitled "PROVIDING ADDITIONAL INFORMATION TO CALLED PARTIES" and filed on Oct. 17, 2007, issued U.S. Pat. No. 8,625,762, issued on Jan. 7, 2014, which claims priority from Provisional application Ser. No. 60/934,407 entitled "SYSTEM, METHOD, AND COMPUTER READABLE MEDIUM FOR PROVIDING ENHANCED AUTOMATIC NUMBER IDENTIFICATION FUNCTIONALITY" and filed on Jun. 13, 2007. The above applications are incorporated herein by reference.

FIELD OF THE INVENTION

The present disclosure is generally related to a communications network, and more particularly to a system, method, and computer readable medium for providing audio announcement of communications to a called party on the communications network.

BACKGROUND OF THE INVENTION

Automatic Number Identification (ANI) is a system utilized by telephone companies to identify the Directory Number (DN) of a calling subscriber. ANI serves a function similar to Caller ID, but may utilize different underlying technology. It is possible that the Caller ID can be blocked by prefixing a call with *67. ANI was originally developed for telephone company billing purposes and is now offered to commercial customers who may benefit from knowing who is calling them. In addition, ANI is one of the core technologies behind the 911 emergency services.

In commercial applications, a user may have an integrated or extraneous display affixed to a telephone. Such a display presents the ANI or telephone number of the calling party. In addition, the display may present the caller's name or calling name, also known as CNAM. Similarly, in case of a Short Messaging Service (SMS), the display may present a sender's name. However, the user may prefer to hear the audio of the information rather then watching the display. As such, a need exists for providing audio announcement along with other information to the user.

SUMMARY OF THE INVENTION

The present disclosure describes a system, method, and computer-readable medium for providing audio announcement of communications to a called party in a communication network. The method includes receiving communication from a calling party and performing a lookup of information relating to the calling party in a database via an Internet Protocol connection based on an identifier of at least one of the calling party and the called party. The information comprises one or more audio files. The method then provides the audio announcement to a called party based on the audio files.

The system for providing audio announcement of communication to a called party in a communication network comprises at least one device for receiving communication from a calling party. The system comprising at least one database for storing information associated with the calling party. The at least one device is operable to perform a lookup of information relating to the calling party in a database via an Internet Protocol connection based on an identifier of at least one of the calling party and the called party, wherein the information comprises one or more audio files, and provide an audio announcement to a called party based on the audio files.

A computer-readable medium comprising instructions executable by a device for providing audio announcement of communications to a called party in a communication network. The computer-readable medium comprising instructions for receiving communication from a calling party; performing a lookup of information relating to the calling party in a database via an Internet Protocol connection based on an identifier of at least one of the calling party and the called party, wherein the information comprises one or more audio files; and providing an audio announcement to a called party based on the audio files.

BRIEF DESCRIPTION OF DRAWINGS

FIGS. 2A, 2B and 2C depict a flowchart of a method or computer readable medium comprising instructions for providing audio announcement of communications to a called party in accordance with one embodiment of the present disclosure.

FIGS. 5A, 5B and 5C depict a flowchart of a method or computer readable medium comprising instructions for providing audio announcement of communications to a wireless called party in accordance with one embodiment of the present disclosure.

DETAILED DESCRIPTION

The present disclosure provides audio announcement of communications to a called party. In the context of the present disclosure, a calling party is a party initiating or sending a call or a message. A called party is a party receiving the call or the message. Such a process is initiated when a calling party contacts or communicates a called party wherein the calling party and the called party each use at least one electronic device and the called party is able to receive ANI or Caller ID service and is able to display/play related information to such service. The message comprises a text message or a multimedia message. The at least one electronic device is at least one of a computer, a audio file database, a wireless phone, an Internet Protocol (IP) enabled phone, a wireless IP-enabled phone, or a device that can receive and/or transmit information. The computer readable medium (or software) of the present disclosure is stored on and/or runs on at least one of the above-mentioned electronic devices.

Figure 1:
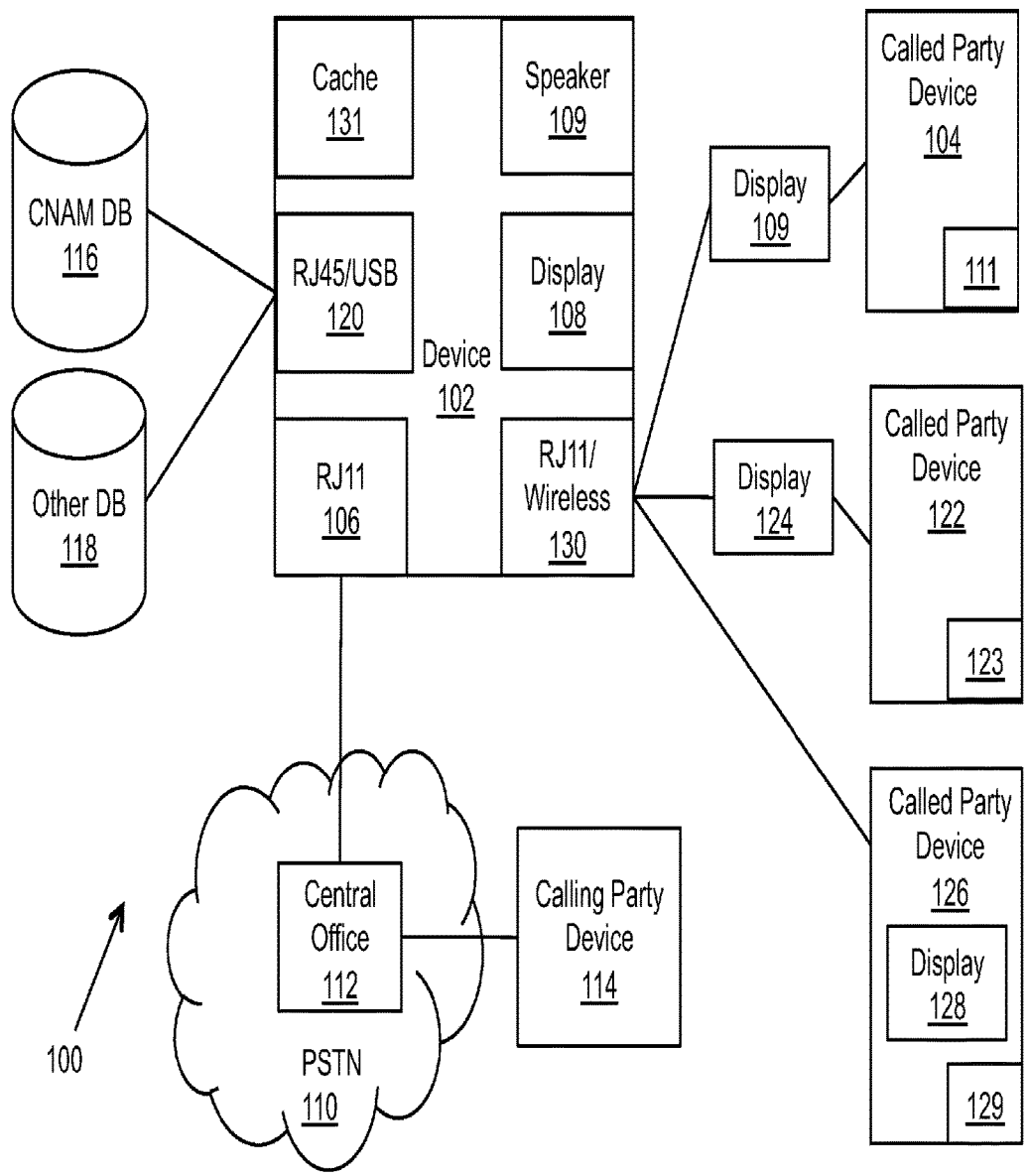
FIG. 1 depicts a system 100 for providing audio response in accordance with one embodiment of the present disclosure.

FIG. 1 depicts a system 100 for providing audio announcement of communications to a called party in accordance with one embodiment of the present disclosure. The system 100 includes a device 102, which is able to communicate with a called party device 104. The device 102 and the called party device 104 may communicate by calling or sending messages. The called party device 104 may be communicably coupled to device 102 via a wired connection or a wireless connection such as a land line telephone or a wireless device including but not limited to a cellular device, a Wi-Fi connection, a PDA, a Bluetooth, etc. The device 102 may be communicably coupled but not limited to a RJ 11 (telephone wire) communication address 106, 120, and/or a RJ11/wireless communication address 130. The device 102 can specify any communication address such as 106, 120, and 130 to receive information. The device 102 has a display 108 and a speaker 109 for presenting the information. In this embodiment, the display 108 and the speaker 109 are integrated within device 102. However, the display 108 and the speaker 109 may be implemented as a standalone device without departing from the spirit and scope of the present disclosure. Moreover, the device 102 may contain modules such as a headset jack or a Bluetooth to play audio. Further, the device 102 may be connected to one or more displays and/or speakers via a wired and/or wireless connection.

In addition, device 102 may receive information from a plurality of sources including but not limited to a communications network 110 such as a public switched telephone network (PSTN), a code division multiple access (CDMA), a global system for mobile communication (GSM). For example, a public switched telephone network (PSTN) that includes a central office 112 that is coupled to a calling party device 114. The information may be received through at least a RJ11 (telephone wire) communication address 106 of device 102. Other sources include a wireless network or data network (not shown) supporting other devices such as a computer or IP enabled phones.

Aspects of the present disclosure provide information to the called parties, such as the called party device 104, by providing an ability to retrieve information of a calling party from a CNAM database 116 and/or an other database 118. The CNAM database 116 and the other database 118 comprise information relating to the calling party, for example, calling party name, telephone number, messages, location, and other information associated with the calling party. In addition, the information relating to the calling party may be a city, a state, an address, a hyperlink, a photo, a video, and any information that can be sent via an Internet Protocol (IP) connection. The device 102 communicates with the CNAM database 116 and/or the other database 118 via an IP connection. The CNAM database 116 and the other database 118 comprise information relating to the calling party, for example, calling party name, telephone number, messages, location, and other information associated with the calling party. In addition, the information relating to the calling party may be a city, a state, an address, a hyperlink, a photo, a video, an announcement, a short film, one or more audio files and any information that can be sent via an Internet Protocol (IP) connection.

When a calling party communicates by calling or sending a message using the calling party device 114, the device 102 receives a caller ID, Automatic Number Identification (ANI) or other identifier from the calling party. An example of the identifier may include an IP address of the calling party device 114 or a unique identifier of the calling party that can be received and transmitted by the calling party device 114. The identifier may include information related to at least one of a calling party and a called party.

In response to receiving the caller ID, ANI or other identifier, the device 102 sends a query for the calling party name to the CNAM database 116 and/or the other database 118. The query may be sent via at least one communication address such as 106, 120, and 130 (the communication address may include but not limited to a wired communication and/or a wireless communication such as a cellular device, a Wi-Fi connection, a PDA, a Bluetooth connection, or the like) of the device 102 to the CNAM database 116 and/or the other database 118 via a direct connection or via a data network (not shown). Once the query is received, a lookup is performed in the CNAM database 116 and/or the other database 118 for the calling party name and other information. If the calling party name is found, the CNAM database 116 and/or the other database 118 returns the calling party name and other information associated with the calling party to the device 102. Thereafter, the device 102 may store the information associated with the calling party in cache 131. In an embodiment, the cache 131 may be implemented as a local storage on the device 102. Further, the information may be stored based on configurable parameters such as, but not limited to, a number of audio files, a time duration, size and so forth. Moreover, the cache 131 may not include any duplicate information or records. For example, the information may be maintained for a total of 100 non-duplicate audio files for names of calling parties. In an embodiment of the invention, the size of the cache 131 may be limited to a predefined limit. For example, the predefined limit may be 200 KB. Further, the cache 131 may be maintained on a rolling basis. For example, after the size of the cache 131 reaches the predefined limit, and when new information is received, then a previous or the earliest information in the cache 131 may be deleted.

The device 102 can maintain the cache 131 by adding, deleting or modifying information corresponding to a calling party or a called party. For example, the device 102 may delete audio files after a predefined number of days. Alternatively, the device 102 may allow a calling party or called party to modify or delete a file or clear data stored on the cache 131. Also, the device 102 ensures the integrity of the data stored in the cache 131. To maintain integrity, the device 102 may generate a key on the fly using attributes of the calling party/called party and encrypt the information including audio response with the key. Alternatively, the device 102 may include software that detects and prevents malicious attack and ensure data safety.

Therefore, when a new communication such as a call or a message is received, the device 102 checks the cache 131 to determine whether the calling party information is located in the cache 131. If the information is present in the cache 131, then the device 102 verifies the status of an indicator for audio announcement. The indicator can be set by a called party or configured by the device 102 to an active or an inactive state. In case the status of the indicator is active, for example, then the device 102 looks up for audio file included in information on the cache 131. Subsequently, audio announcement is played based on the audio file. For example, at least the name of the calling party may be announced as the audio. Otherwise, in case the indicator is inactive then the device 102 looks up for the information excluding the audio file in the cache 131. Thereafter, the information is displayed on the display 108 of the device 102.

In one embodiment of the invention, if the information is not available in the cache 131, then the device 102 verifies the status of an indicator. Thereafter, if the status of the indicator is active, then the device 102 sends a query, for example, with the calling party number or other identifier to the CNAM database 116 and/or the other database 118 for lookup of information including the audio file. The CNAM database 116 and/or the other database 118 return calling party information to the device 102 if the calling party name/number and corresponding audio file is found in the respective database. Thereafter, the audio announcement is played based on the audio file. In an embodiment of the invention, the audio file is streamed to the device 102 for playing the audio announcement. For example, the audio announcement may be played when the audio file is being downloaded and/or stored on the device 102. In another embodiment of the invention, the audio file is downloaded and stored in the cache 131. Therefore, the device 102 may not be required to connect to the CNAM database 116 and/or the other database 118 when the information is available in the cache 131. However, if the status of the indicator is set as inactive, then the device 102 looks up for the information excluding the audio file in the CNAM database 116 and/or the other database 118. Thereafter, the information is displayed on the display 108 of the device 102.

The device 102 may provide a playback preference to the called party for selecting a module for playback of the audio announcement. The modules include for example, but not limited to, a headset, a speaker or a Bluetooth device, such as an external device capable of playing audio through Bluetooth pairing. The device 102 captures the playback preference of a module for the called party. For example, the playback preference option may include language control/selection option from the service provider site 408 but the language control/selection option may further include the central office 112, the device 102, the calling party, and the called party. In another embodiment of the invention, the CNAM request can also include the language indicator to let the service provider site 408 and/or the central office 112 informs the spoken language to generate the audio file. Further, the device 102 may have a default module in case a module as selected by the user is not available. For example, the default module may be the speaker 109 of the device 102. Thereafter, the audio announcement may be played through the module. However, in case the selected module is not available then the default module may be selected for playback. For example, the called party device 104 may enable the audio response to be played over "Bluetooth" and over the ringer speaker with a ringer interrupt. Alternatively, the called party device 104 may enable the textual name to be displayed over "Bluetooth" to external displays such as in automobiles.

In addition to displaying/playing the information and audio response, device 102 may send the information to other user devices, such as called party devices 104, 122, and 126, to be contemporaneously displayed on displays 109, 124, and 128 respectively and played on their speakers 111, 123 and 129 respectively. In an embodiment, while the audio announcement is played, the audio announcement may refer to links that are displayed on the display 108. Further, the links displayed may be clickable. For this, a URL may be embedded with the information displayed on the display 108. Further, when the called party clicks the URL, a browser is launched with relevant information of the called party.

In this example, displays 109, 124, and 128 are implemented as standalone devices. In other embodiments, the displays 109, 124, and 128 or speakers 111, 123 and 129 can be communicably coupled to called party devices 104, 122, and 126 or may be integrated with called party devices 104, 122 and 126 without departing from the spirit and scope of the present disclosure. For example, display 128 may be integrated as part of the called party device 126 and the device 102 may send information directly to the called party device 126 to be displayed on display 128. The information may be sent from at least one communication address such as 106, 120, 130 of the device 102 or via wireless connection 130.

The information/audio response received at the device 102 may include number(s) that indicates the sender's phone number, as well as the sender's name, city, and/or state. In addition, the information/audio response includes for example alerts in response to an occurrence of an event, informative and promotional information from a service provider, and situational information from an emergency service provider. Furthermore, the information/audio response may include information relating to the calling party, such as an address, a hyperlink, a photo, a video, and any information that can be sent via an Internet Protocol connection.

Figure 2A:
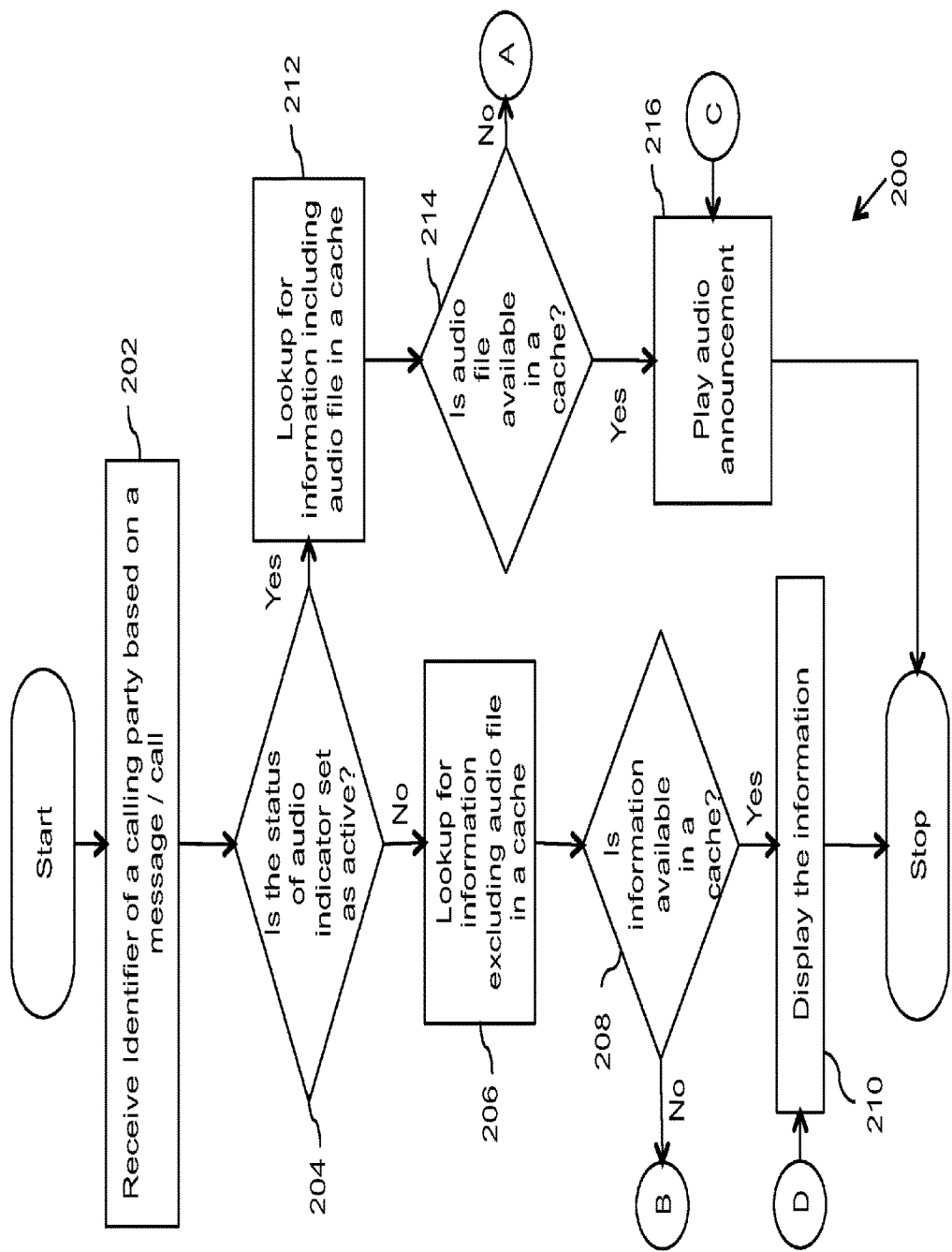

Referring to FIGS. 2A, 2B, and 2C, a flowchart of a method or computer readable medium comprising instructions for providing audio response to a called party is depicted in accordance with one embodiment of the present disclosure. In this example, process 200 may be implemented as instructions executed within the device 102. Process 200 begins at step 202 with receiving a caller ID or identifier of the calling party from a calling party device. The caller ID, ANI or other identifier may be received at at least one communication address such as 106, 120, 130 of device 102. Thereafter, at step 204 it is determined if the status of an indicator for audio response is set as active. If the indicator is set to active, then the process continues to step 212, else if inactive, then the process continues to step 206.

At step 212, a lookup is performed in the cache 131 of the device 102 for the audio files corresponding to the identifier. Thereafter, at step 214 if the audio file is available in the cache 131 then the audio announcement is played at step 216. Otherwise, if the information or the audio files is not available, then the process 200 continues to step 218. At step 218, a lookup is performed in the CNAM database 116 and/or the other database 118. Subsequently, at step 220, the information is downloaded and stored in the cache 131. Further, the audio announcement is played based on the audio file at step 216. In an embodiment of the invention, the audio announcement is streamed or played while being downloaded. As a result, the waiting time for the download and then playing the file is reduced. In another embodiment of the invention, the audio file is downloaded on the device 102 and then the announcement is played.

As discussed above, if the audio indicator status is not set to active, then the lookup is performed in the cache 131 for information excluding the audio file. For example, the lookup may be performed for text data such as name of the called party, but excluding the audio file. The process 200 then continues to step 208, where it is determined whether the information is available in the cache 131. In case, the information is available then the information is displayed on the device 102 at step 210. Otherwise, the process continues to step 222, where the information is looked up excluding the audio file. Subsequently, the information is displayed at step 210. In an embodiment of the invention, the information displayed at step 210 is clickable. For example, the text displayed from the information can be clicked to open a browser for additional information.

Figure 3:
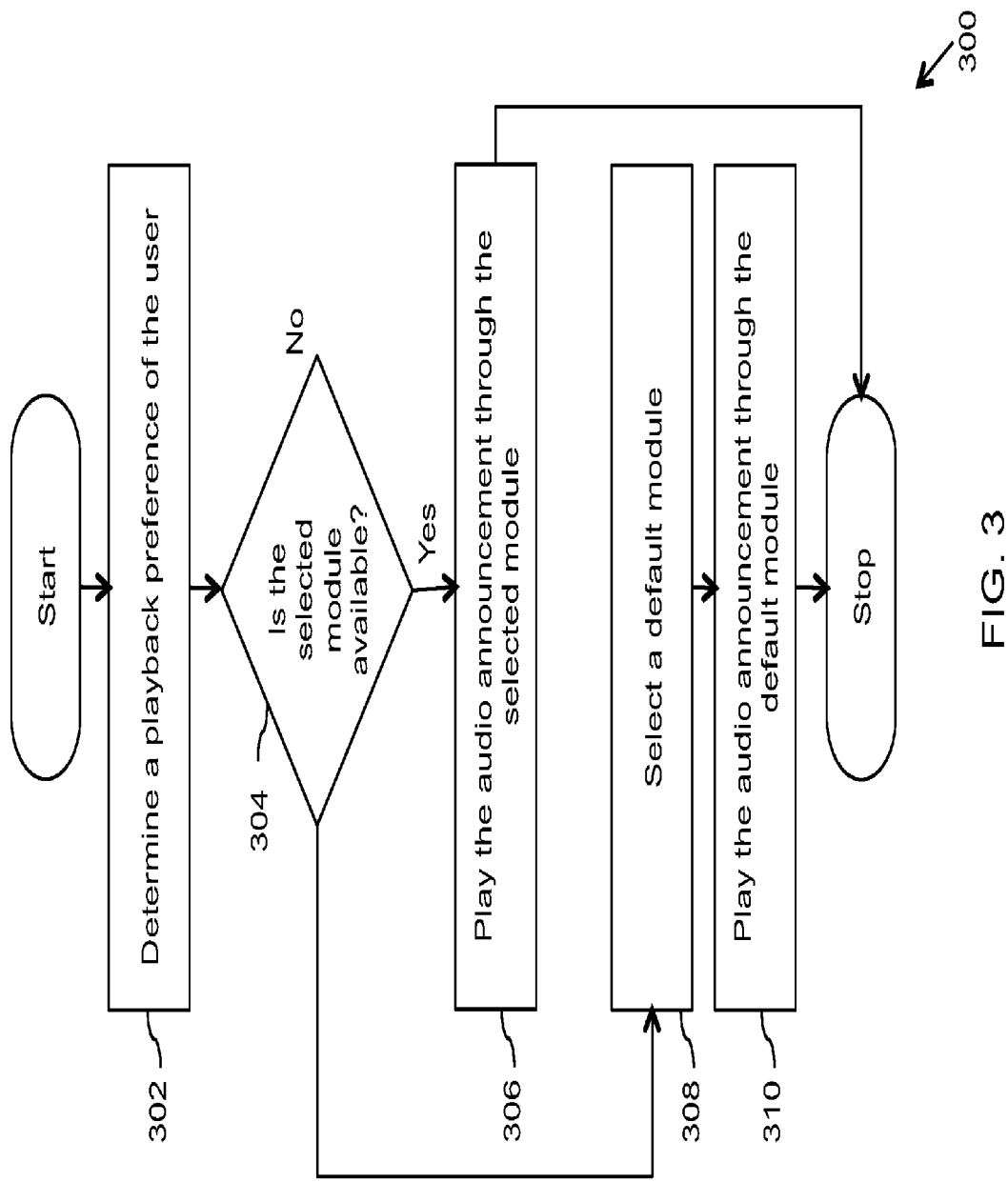
FIG. 3 depicts a flowchart of a process (which includes a method or computer readable medium comprising instructions) is depicted for playing audio announcement based on playback preference in accordance with an embodiment of the present disclosure.

Referring to FIG. 3, a flowchart of a process (which includes a method or computer readable medium comprising instructions) is depicted for playing audio announcement based on playback preference, in accordance with an embodiment of the present disclosure. Process 300 begins at step 302, where a playback preference of the user is determined. For example, the user may select a module from preferences such as a headset, a speaker a Bluetooth device and so forth. Thereafter, at step 304, it is determined whether the selected module based on the playback preference of the user is available.

In case, the selected module is available, then the audio announcement is played through the selected module at step 306. Otherwise, if the selected module is not available, then a default module is selected at step 308. For example, a default module may be the speaker of the device 102. Subsequently, the audio announcement is played through the default module at step 310.

Figure 4:
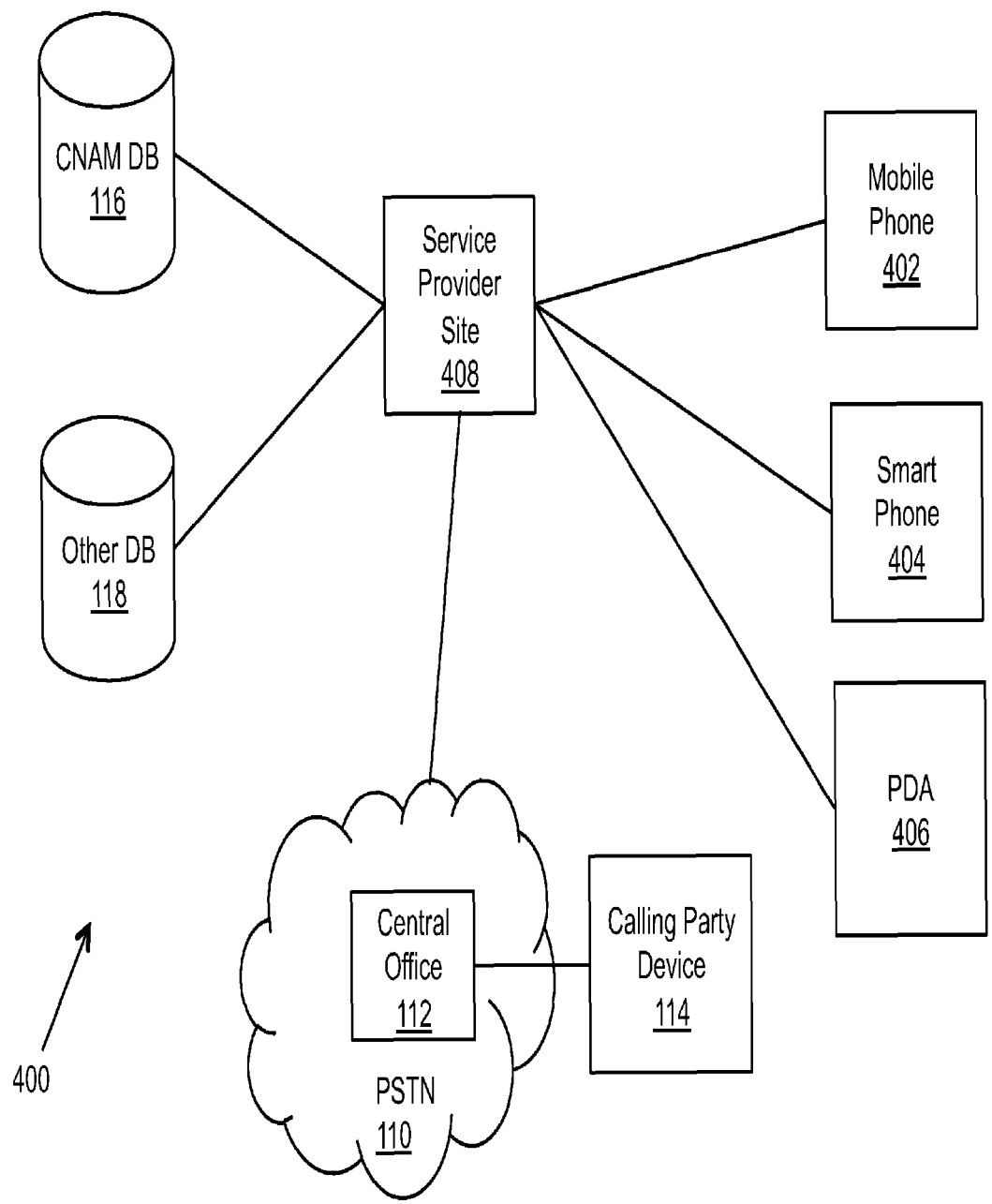
FIG. 4 depicts a system 400 for providing audio response to a wireless called party in accordance with one embodiment of the present disclosure.

Referring to FIG. 4, a system 400 providing audio response to a wireless called party in accordance with an alternative embodiment of the present disclosure. System 400 is similar to system 100 in FIG. 1, except that device 102 is implemented as a wireless communication enabled device. Device 102 is being implemented as a mobile phone 402, a smart phone 404, or a Personal Digital Assistant (PDA) 406. In an embodiment of the invention, the software of device 102 is implemented on called party devices such as the mobile phone 402, the smart phone 404, or the PDA 406. To send and receive information to and from the CNAM database 116 or other database 118, one or more of mobile devices 402, 404, and 406 can wirelessly communicate with a service provider site 408, which is also communicably coupled to the CNAM database 116 and the other databases 118 via a data network (not shown) and the calling party device(s) 114 via at least one communication network such as a public switched telephone network (PSTN) 110, a code division multiple access (CDMA), a global system for mobile communication (GSM). The calling party device 114 can be, but not limited to, a mobile phone, a smart phone, a PDA, a landline and so forth.

In one embodiment of the present disclosure, a calling party device 114 connects to a receiving party device such as a mobile phone 402, a smart phone 404, or a PDA 406. At least one of the receiving party devices includes software to obtain information based on the caller ID, ANI or other identifier. The receiving party devices such as 402, 404, and 406 may receive calling party 114 phone number via a service provider 408. The receiving party device, such as the mobile phone 402, retrieves the phone number through the software and sends it to the service provider 408 through internet connectivity including but not limited to FTP, HTTP, TELNET, etc. The service provider 408 may function as a web server, listening information and requests from the software. When the service provider 408 receives a request with calling party 114 phone number, it sends the request to at least the CNAM DB 116 for name or Message DB 132 for message. In another embodiment of the present disclosure, at least the calling party 114 name or other information is returned by at least the CNAM database 116, an audio file is generated based on at least the name from the CNAM database 116. The generated file may then be stored at least in the mobile phone 402 as a table for later matching at the name requests or other information. The information gathered from at least the 116 and 132 by the service provider 408 is sends to the receiving party device such as the mobile phone 402 (not shown).

In accordance with one embodiment of the present disclosure, aspects of the present disclosure are provided within the called party devices. Thus, when a calling party communicates by calling or sending a message using the calling party device 114, the calling party device such as mobile device 402 receives a caller ID, Automatic Number Identification (ANI) or other identifier from the calling party. An example of the identifier may include an IP address of the calling party device 114 or a unique identifier of the calling party that can be received and transmitted by the calling party device 114. The identifier may include information related to at least one of a calling party and a called party.

In response to receiving the caller ID, ANI or other identifier, the called party device 402 sends a query for the calling party name to the CNAM database 116 and/or the other database 118. The query may be sent wirelessly from the called party device 402 to the CNAM database 116 and/or the other database 118 via a direct connection or via a data network (not shown). Once the query is received, a lookup is performed in the CNAM database 116 and/or the other database 118 for the calling party name and other information. If the calling party name is found, the CNAM database 116 and/or the other database 118 returns the calling party name and other information associated with the calling party to the called party device 402. Thereafter, the called party device 402 may store the information associated with the calling party in cache 131. In an embodiment, the cache 131 may be implemented as a local storage on the called party device 402. Further, the information may be stored based on configurable parameters such as, but not limited to, a number of audio files, a time duration, size and so forth. Moreover, the cache 131 may not include any duplicate information or records. For example, the information may be maintained for a total of 100 non-duplicate audio files for names of calling parties. In an embodiment of the invention, the size of the cache 131 may be limited to a predefined limit. For example, the predefined limit may be 200 KB. Further, the cache 131 may be maintained on a rolling basis. For example, after the size of the cache 131 reaches the predefined limit, and when new information is received, then a previous or the earliest information in the cache 131 may be deleted.

The called party device 402 can maintain the cache 131 by adding, deleting or modifying information corresponding to a calling party or a called party. For example, the called party device 402 may delete audio files after a predefined number of days. Alternatively, the called party device 402 may allow a calling party or called party to modify or delete a file or clear data stored on the cache 131. Also, the called party device 402 ensures the integrity of the data stored in the cache 131. To maintain integrity, the called party device 402 may generate a key on the fly using attributes of the calling party/called party and encrypt the information including audio response with the key. Alternatively, the called party device 402 may include software that detects and prevents malicious attack and ensure data safety.

Therefore, when a new communication such as a call or a message is received, the called party device 402 checks the cache 131 to determine whether the calling party information is located in the cache 131. If the information is present in the cache 131, then the called party device 402 verifies the status of an indicator for audio announcement. The indicator can be set by a called party or configured by the called party device 402 to an active or an inactive state. In case the status of the indicator is active, for example, then the called party device 402 looks up for audio file included in information on the cache 131. Subsequently, audio announcement is played based on the audio file. For example, the name of the calling party may be announced as the audio. Otherwise, in case the indicator is inactive then the called party device 402 looks up for the information excluding the audio file in the cache 131. Thereafter, the information is displayed on the called party device 402.

In one embodiment of the invention, if the information is not available in the cache 131, then the called party device 402 verifies the status of an indicator. Thereafter, if the status of the indicator is active, then the called party device 402 sends a query, for example, with the calling party number or other identifier to the CNAM database 116 and/or the other database 118 for lookup of information including the audio file. The CNAM database 116 and/or the other database 118 return calling party information to the called party device 402 if the calling party name/number and corresponding audio file is found in the respective database. Thereafter, the audio announcement is played based on the audio file. In an embodiment of the invention, the audio file is streamed to the called party device 402 for playing the audio announcement. For example, the audio announcement may be played when the audio file is being downloaded and/or stored on the called party device 402. In another embodiment of the invention, the audio file is downloaded and stored in the cache 131. Therefore, the called party device 402 may not be required to connect to the CNAM database 116 and/or the other database 118 when the information is available in the cache 131. However, if the status of the indicator is set as inactive, then the called party device 402 looks up for the information excluding the audio file in the CNAM database 116 and/or the other database 118. Thereafter, the information is displayed on the called party device 402.

Figure 5A:
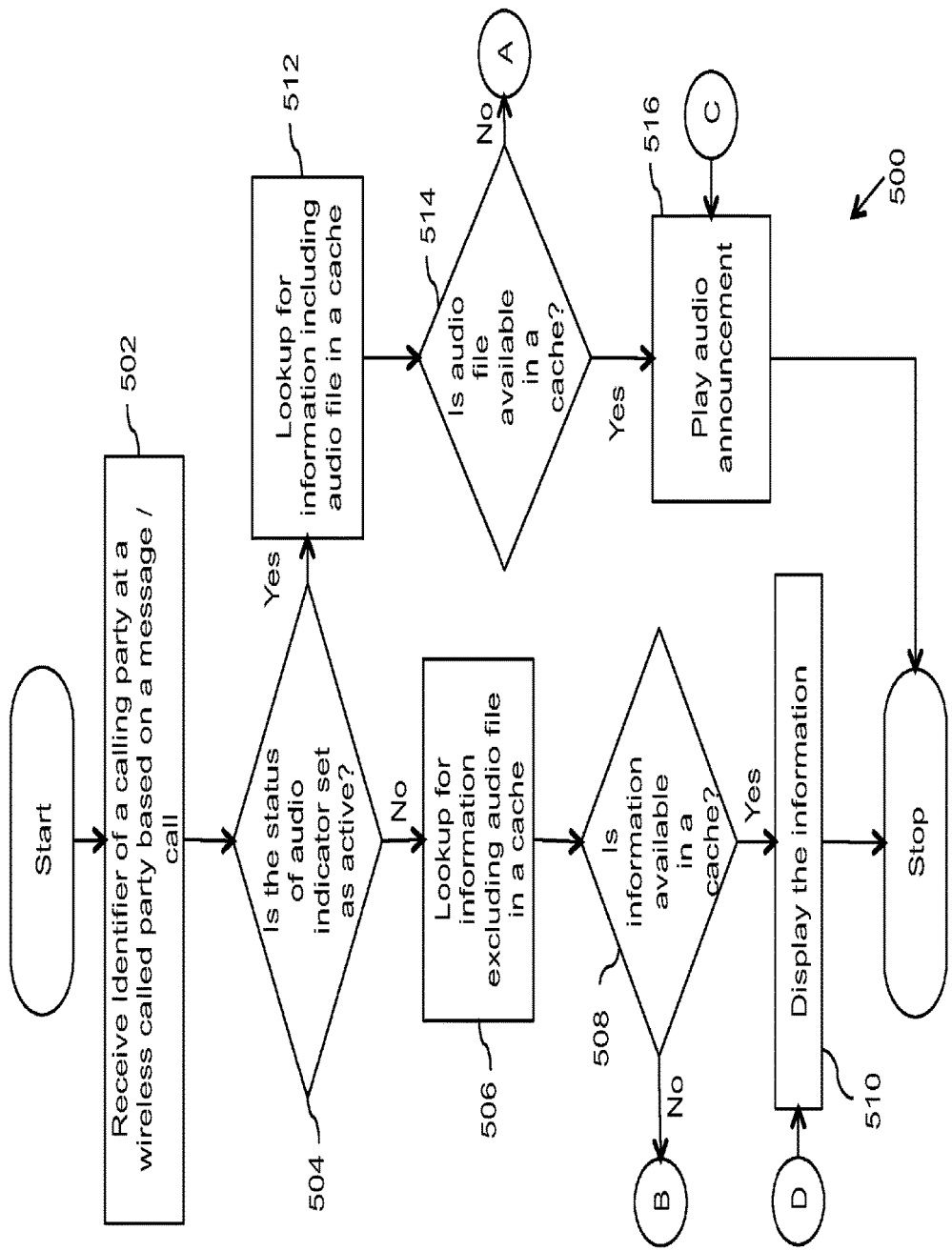

Referring to FIGS. 5A, 5B, and 5C, a flowchart of a method or computer readable medium comprising instructions for providing audio response to a wireless called party is depicted in accordance with one embodiment of the present disclosure. In this example, process 500 may be implemented as instructions executed within the called party device 402. Process 500 begins at step 502 with receiving a caller ID or identifier of the calling party from a calling party device. The caller ID, ANI or other identifier may be received wirelessly at the called party device 402. Thereafter, at step 504 it is determined if the status of an indicator for audio response is set as active. If the indicator is set to active, then the process continues to step 512, else if inactive, then the process continues to step 506.

At step 512, a lookup is performed in the cache 131 of the called party device 402 for the audio files corresponding to the identifier. Thereafter, at step 514 if the audio file is available in the cache 131 then the audio announcement is played at step 516. Otherwise, if the information or the audio files is not available, then the process 500 continues to step 518. At step 518, a lookup is performed in the CNAM database 116 and/or the other database 118. Subsequently, at step 520, the information is downloaded and stored in the cache 131. Further, the audio announcement is played based on the audio file at step 516. In an embodiment of the invention, the audio announcement is streamed or played while being downloaded. As a result, the waiting time for the download and then playing the file is reduced. In another embodiment of the invention, the audio file is downloaded on the called party device 402 and then the announcement is played.

As discussed above, if the audio indicator status is not set to active, then the lookup is performed in the cache 131 for information excluding the audio file. For example, the lookup may be performed for text data such as name of the called party, but excluding the audio file. The process 500 then continues to step 508, where it is determined whether the information is available in the cache 131. In case, the information is available then the information is displayed on the called party device 402 at step 510. Otherwise, the process continues to step 522, where the information is looked up excluding the audio file. Subsequently, the information is displayed at step 510. In an embodiment of the invention, the information displayed at step 510 is clickable. For example, the text displayed from the information can be clicked to open a browser for additional information.

Although an exemplary embodiment of the system, method, and computer readable medium of the present disclosure has been illustrated in the accompanied drawings and described in the foregoing detailed description, it will be understood that the invention is not limited to the embodiments disclosed, but is capable of numerous rearrangements, modifications, and substitutions without departing from the spirit and scope of the present disclosure as set forth and defined by the following claims. For example, a greater or lesser numbers of elements, modules, hardware, software, and/or firmware can be used to provide information delivery without departing from the spirit and scope of the present disclosure. Also, the device 102 may be a wireless mobile phone, a personal digital assistant, a cellular phone, an IP-enabled caller ID device, or a wired telephone that has IP communication capabilities. Further, the device 102 may include a memory (not shown) and a processor (not shown) to execute the process or the instructions. The memory may be for example, a Read Only Memory (ROM), a Random Access Memory (RAM), a disc media or any other computer readable medium comprising instruction executable by the processor. Although the device 102 is shown separate from the receiving party device 104, a person skilled in the art will appreciate that they can be co-located. Moreover, the receiving party device 104 may include all the functionalities of the device 102, without departing from the scope of this invention.

The embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions can be loaded onto one or more general purpose computers, or other programmable data processing apparatus to produce machines, such that the instructions which execute on the computers or other programmable data processing apparatus create means for implementing the functions specified in the block or blocks. Such computer program instructions can also be stored in a computer-readable memory that can direct a computer or other programmable data processing apparatus to function in a particular manner, such that the instructions stored in the computer-readable memory produce an article of manufacture including instruction means that implement the function specified in the block or blocks.

What is claimed is:

1. A method, comprising:
performing, by a called party device,
a lookup in a cache at the called party device of information relating to a calling party;
when the information is not available in the cache, a lookup on a data source remote from the called party device of the information relating to the calling party, wherein the information comprises one or more audio files; and
streaming an audio announcement to the called party device while storing the information in the cache to reduce waiting time, wherein the size of the cache is maintained below a predefined limit.

2. The method of claim 1 further comprising verifying a status of an audio indicator.

3. The method of claim 2, wherein the lookup of the information is performed if the status of the audio indicator is set as active.

4. The method of claim 2, wherein the lookup of the information is not performed if the status of the audio indicator is set as inactive.

5. The method of claim 1, wherein the performing, by the called party device is in response to receiving a communication from the calling party.

6. The method of claim 1, wherein the providing comprises streaming the audio announcement to the called party.

7. The method of claim 1, wherein the providing comprises downloading the information at the called party.

8. The method of claim 1, wherein the providing comprises playing the audio announcement from the audio files.

9. The method of claim 1 further comprising:
selecting a first module for playing the audio announcement based on a playback preference; and
selecting a default module for playing the audio announcement when the first module is not available.

10. The method of claim 9, wherein the first module comprises at least one of a headset, a speaker and a Bluetooth device.

11. The method of claim 5, wherein the communication to the called party includes one or more of a call or a message.

12. The method of claim 1, wherein the information relating to the calling party further comprises at least one of a telephone number of the calling party, a name, a city, a state, an address, a photo, a video, a text, a hyperlink, and any other information that can be sent via an Internet Protocol connection.

13. A system, comprising:
at least one device configured to perform,
a lookup in a cache at the device of information relating to a calling party;
when the information is not available in the cache, a lookup on a data source remote from the device of the information relating to the calling party;
wherein the information comprises one or more audio files; and
stream an audio announcement while storing the information in the cache to reduce waiting time, wherein the size of the cache is maintained below a predefined limit.

14. The system of claim 13, wherein the device is further operable to verify a status of an audio indicator.

15. The system of claim 13, wherein the device is operable to perform at least one of:
stream the audio announcement to a called party;
download the information at the called party; and
play the audio announcement from the audio files.

16. The system of claim 13, wherein the device is operable to perform:
a selection of a first module for playing the audio announcement based on a playback preference; and
a selection of a default module for playing the audio announcement when the first module is not available.

17. The system of claim 13, wherein the at least one device is operable to perform is in response to a receipt of a communication from the calling party to the device that includes one or more of a call or a message.

18. A non-transitory computer-readable storage medium comprising instructions that when executed by a processor perform:
looking up in a cache at a called party device of information relating to a calling party; and
streaming an audio announcement while storing the information in the cache to reduce waiting time, wherein the size of the cache is maintained below a predefined limit.

19. The non-transitory computer-readable storage medium of claim 18, wherein the looking is in response to a receipt of a communication from the calling party to the called party that includes one or more of a call or a message.

20. The non-transitory computer-readable storage medium of claim 18, further comprising instructions that when executed by a processor perform at least one of:
streaming the audio announcement to a called party;
downloading the audio files at the called party; and
playing the audio announcement from the audio files.

* * * * *